July 20, 1954
M. G. KANOCZ
2,683,889
VEHICLE DOOR PROTECTOR
Filed Oct. 27, 1950
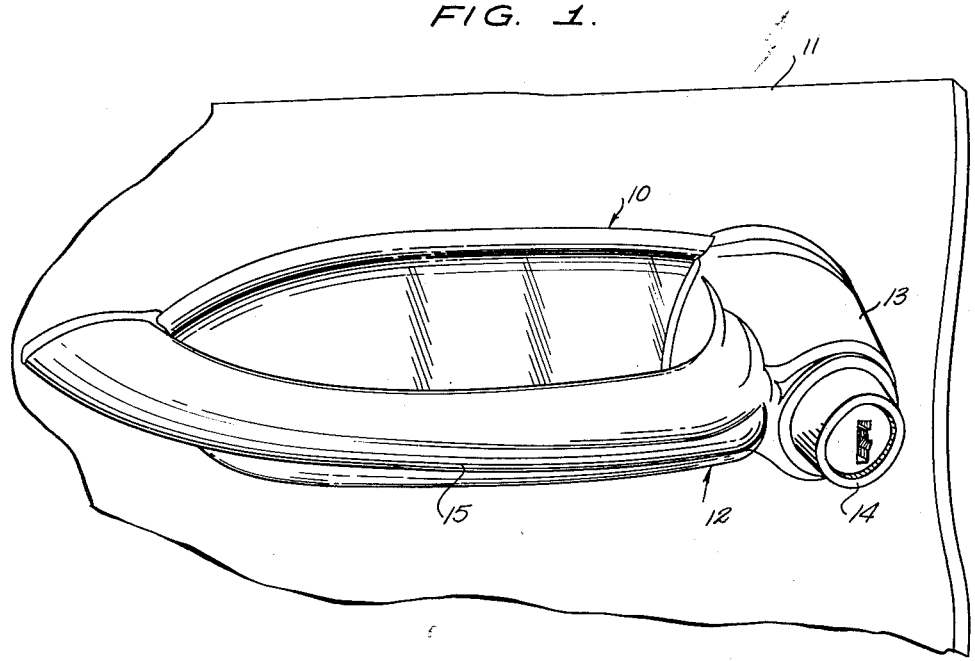
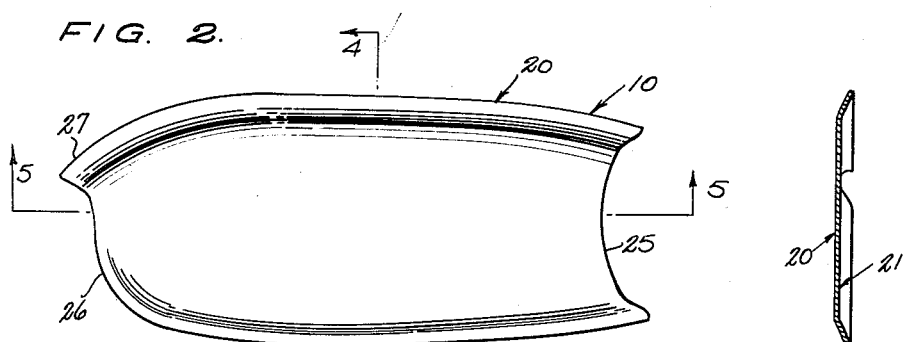
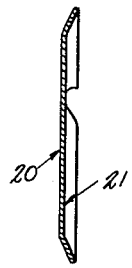
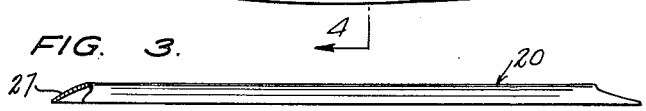
INVENTOR
MIKE G. KANOCZ,
BY
McMorrow, Berman & Davidson
ATTORNEYS Patented July 20, 1954

2,683,889

UNITED STATES PATENT OFFICE 2,683,889

VEHICLE DOOR PROTECTOR

Mike G. Kanocz, Kenosha, Wis.

Application October 27, 1950, Serial No. 192,568

1 Claim. (Cl. 16—1)

This invention relates to a protector for attachment to an automobile body contiguous to a door handle.

An object of this invention is to provide a protector for attachment contiguous to the door handle of an automotive vehicle which ornamentally covers and protects the adjacent portions of the vehicle body normally marred and scratched due to contact with the fingers during opening and closing the vehicle door.

Another object of this invention is to provide a protector which is adapted for permanent securement to a vehicle body contiguous to the door handles thereof, the securement being effected in a manner to withstand constant weathering and shock due to the automobile doors being slammed.

A further object of this invention is to provide a protector for attachment to a vehicle body contiguous to the door handles which is relatively simple in structure and cheap to manufacture.

The above and still further objects and advantages of the invention will become apparent upon consideration of the following detailed description of the invention, when taken in conjunction with the accompanying drawings, wherein:

Figure 1 is a perspective view of the door protector of the present invention, shown secured to a vehicle body contiguous to a door handle;

Figure 2 is a front elevational view of the door protector of the present invention;

Figure 3 is a side elevational view of the door protector shown in Figure 2;

Figure 4 is a sectional view taken along the line 4—4 of Figure 2; and

Figure 5 is a sectional view taken along the line 5—5 of Figure 2.

Referring now more particularly to the drawings, wherein like reference numerals have been used throughout the several views to designate like parts, there is shown the door protector of the present invention, generally designated by the reference numeral 10, which is secured to the vehicle body 11 contiguous to the door handle 12, the handle embodying a barrel 13 having a lock 14 of the depressible-cylinder type supported therein and having one of its ends secured to the vehicle body 11, and an arcuate gripping element 15 disposed transversely of the barrel 13 and having one of its ends secured to the vehicle body 11 and having the other of its ends secured to the barrel 13 contiguous to its free end.

The door protector 10 embodies a cover plate 20 having a streamlined, ornamental exterior and provided with a shallow concavity 21 adapted to confront the vehicle body 11. The exterior surface of the plate 20 may be chromium plated to simulate in appearance the numerous other ornamental trim elements which are secured exteriorly of an automotive vehicle body.

Positioned within the concavity 21 is a filler body 22 which is fabricated of a rubber-like material, illustrated as sponge rubber. The filler body 22 is fixedly secured within the concavity 21 of the cover plate by means of the cement, designated by the reference numeral 23. The exposed face of the filler body 23 is coated with a suitable cement, designated by the reference numeral 24, for effecting the securement of the assembly of the filler body 22 and the cover plate 20 to the vehicle body 11.

As clearly shown in Figure 2, one end of the cover plate 20 is arcuately cut away, as indicated by the reference numeral 25 for engagement about the adjacent portion of the barrel 13 upon securement of the protector to the vehicle body. The other end of the cover plate 20 is provided with a generally ogee contour, designated by the reference numeral 26, which forms an extending nose 27 for engagement with the adjacent portions of the gripping element 15. Accordingly, upon effecting securement of the cover plate 20 to the vehicle body 11, the arcuately cutaway ends 25, 26 cooperate with the adjacent portions of the door handle 12 to further impart stability and permanence in the securement of the protector 10 to the vehicle body.

In actual use, the door handle 12 is usually actuated by manually grasping the gripping element 15 and depressing the lock 14 with one of the fingers. During this operation, the nails of the fingers often come into contact with the adjacent portions of the vehicle body 11 and mar and scratch the latter. With the protector 10 fixedly secured in the position illustrated in Figure 1, it is readily apparent that the fingers will come into contact with the protector instead. As previously pointed out, the exterior of the protector is provided with chromium-finished, ornamental surfaces, and accordingly can withstand the scratching without any noticeable marring.

It is to be noted (Figures 1 and 2) that the protector is of a particular shape adapted to coact with the laterally extended end portions of the door handle in guiding the cover plate of the protector to its proper position relative to the handle during the mounting of the protector upon the door. The means embodied in the protector to accomplish this purpose serves also to support the protector at its opposite ends upon the respective end portions of the handle, so that any loss of adhesion between the protector and the door body will not result in the protector dropping off the door and becoming lost. In this connection, the provision of the arcuately cutaway end 25 of the cover plate defines, at opposite ends of the indented end edge 25, projections that extend from the respective side edges of the cover plate. At the other end of the cover plate, one projection or nose 27 is provided. The nose 27 extending from one side edge of the cover plate, and the projection extending from the other end of the same side edge of the plate, extend partially about the respective end portions of the handle so as to provide the desired plate positioning and support means.

Although only one embodiment of the protector of the present invention has been described, it is readily apparent that numerous modifications can be made without departing from the spirit of the invention as set forth in the appended claim.

What I claim is:

A protector for a door equipped with a handle of the type having an elongated gripping element and end portions extending laterally from said element and secured rigidly to the door, comprising a plate one end edge of which has an arcuate indentation extending from side to side of the plate to form, at opposite ends of the indentation, projections extending outwardly of the plate from said end edge for engagement with one end portion of said handle, the other end edge of the plate having an ogee configuration terminating in a nose extending outwardly of the plate from said other end edge and engageable against the other end portion of said handle.

References Cited in the file of this patent

UNITED STATES PATENTS

| Number | Name | Date |
|---|---|---|
| 1,270,871 | Rixson | July 2, 1918 |
| 1,810,510 | Winne | June 16, 1931 |
| 2,028,071 | Kemper | Jan. 17, 1936 |
| 2,202,903 | Fergueson | June 4, 1940 |
| 2,228,674 | Raymond | Jan. 14, 1941 |
| 2,319,675 | Grinter | May 18, 1943 |
| 2,489,072 | Ausubel | Nov. 22, 1949 |
| 2,531,670 | Cain | Nov. 28, 1950 |